(12) United States Patent
Comanzo et al.

(10) Patent No.: US 8,545,723 B2
(45) Date of Patent: Oct. 1, 2013

(54) PERSISTENT PHOSPHOR

(75) Inventors: Holly Ann Comanzo, Niskayuna, NY (US); Alok Mani Srivastava, Niskayuna, NY (US); William Winder Beers, Chesterland, OH (US); Sergio Martins Loureiro, Glastonbury, CT (US); Anant Achyut Setlur, Niskayuna, NY (US); Stanley John Stoklosa, Clifton Park, NY (US); Claire Susan Henderson, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 247 days.

(21) Appl. No.: 13/075,477

(22) Filed: Mar. 30, 2011

(65) Prior Publication Data

US 2011/0175029 A1 Jul. 21, 2011

Related U.S. Application Data

(63) Continuation-in-part of application No. 11/954,814, filed on Dec. 12, 2007, now Pat. No. 7,959,827.

(51) Int. Cl.
*C09K 11/55* (2006.01)
*C09K 11/64* (2006.01)

(52) U.S. Cl.
USPC .............................. 252/301.4 R; 252/301.6 R

(58) Field of Classification Search
USPC ..................... 252/301.4 R, 301.6 R
See application file for complete search history.

(56) References Cited

U.S. PATENT DOCUMENTS

| | | | |
|---|---|---|---|
| 4,631,144 A | 12/1986 | Beers et al. | |
| 4,638,214 A | 1/1987 | Beers et al. | |
| 5,230,831 A | 7/1993 | Srivastava | |
| 5,273,681 A | 12/1993 | Srivastava | |
| 5,273,732 A | 12/1993 | Srivastava et al. | |
| 5,312,612 A | 5/1994 | Srivastava et al. | |

(Continued)

FOREIGN PATENT DOCUMENTS

| | | |
|---|---|---|
| EP | 0877071 B1 | 11/1998 |
| EP | 1661964 A1 | 5/2006 |
| WO | WO9950372 A1 | 10/1999 |

OTHER PUBLICATIONS

Sun et al., "Synthesis of SrAl2O4:Eu2+,Dy3+ Phosphors by the Coupling Route of Microemulsion With Coprecipitation Method", Rare Metals, vol. 25, No. 6, pp. 615-619, Dec. 2006.

(Continued)

*Primary Examiner* — Carol M Koslow
(74) *Attorney, Agent, or Firm* — Mary Louise Stanford

(57) ABSTRACT

A persistent phosphor of formula I is provided, along with methods for making and using the phosphor:

$$A_xAl_yO_4:Eu_j, RE_k, B_m, Zn_n, Co_o, Sc_p \qquad I$$

wherein:
A is Ba, Sr, Ca, or a combination of these metals;
x is greater than about 0.75 and less than about 1.3;
y is greater than or equal to about 1.6 and less than or equal to 2;
j is greater than about 0.0005 and less than about 0.1;
k is greater than about 0.0005 and less than about 0.1;
m is greater than or equal to 0 and less than about 0.30;
n is greater than 0 and less than about 0.10;
o is greater than 0 and less than about 0.01;
p is greater than 0 and less than about 0.05; and
RE is Dy, Nd, or a combination thereof.

Applications for such phosphors include use in toys, emergency equipment, clothing, and instrument panels, among others.

4 Claims, 12 Drawing Sheets

(56) References Cited

U.S. PATENT DOCUMENTS

| | | |
|---|---|---|
| 5,376,303 A | 12/1994 | Royce et al. |
| 5,770,111 A | 6/1998 | Moriyama et al. |
| 5,874,491 A | 2/1999 | Anders |
| 5,961,072 A | 10/1999 | Bodle |
| 6,005,024 A | 12/1999 | Anders et al. |
| 6,010,644 A | 1/2000 | Fu et al. |
| 6,074,739 A | 6/2000 | Katagiri |
| 6,123,871 A | 9/2000 | Carroll |
| 6,190,577 B1 | 2/2001 | Hase et al. |
| 6,210,605 B1 | 4/2001 | Srivastava et al. |
| 6,246,744 B1 | 6/2001 | Duclos et al. |
| 6,252,254 B1 | 6/2001 | Soules et al. |
| 6,255,670 B1 | 7/2001 | Srivastava et al. |
| 6,276,634 B1 | 8/2001 | Bodle |
| 6,278,135 B1 | 8/2001 | Srivastava et al. |
| 6,280,655 B1 | 8/2001 | Xu et al. |
| 6,294,800 B1 | 9/2001 | Duggal et al. |
| 6,302,959 B2 | 10/2001 | Srivastava et al. |
| 6,357,889 B1 | 3/2002 | Duggal et al. |
| 6,358,441 B2 | 3/2002 | Duclos et al. |
| 6,366,033 B1 | 4/2002 | Greci et al. |
| 6,375,864 B1 | 4/2002 | Phillips et al. |
| 6,402,987 B1 | 6/2002 | Srivastava et al. |
| 6,429,583 B1 | 8/2002 | Levinson et al. |
| 6,436,313 B1 | 8/2002 | Srivastava et al. |
| 6,466,135 B1 | 10/2002 | Srivastava et al. |
| 6,469,322 B1 | 10/2002 | Srivastava et al. |
| 6,501,100 B1 | 12/2002 | Srivastava et al. |
| 6,515,314 B1 | 2/2003 | Duggal et al. |
| 6,522,065 B1 | 2/2003 | Srivastava et al. |
| 6,538,371 B1 | 3/2003 | Duggal et al. |
| 6,555,958 B1 | 4/2003 | Srivastava et al. |
| 6,580,097 B1 | 6/2003 | Soules et al. |
| 6,596,195 B2 | 7/2003 | Srivastava et al. |
| 6,613,137 B2 | 9/2003 | Egger et al. |
| 6,616,862 B2 | 9/2003 | Srivastava et al. |
| 6,621,211 B1 | 9/2003 | Srivastava et al. |
| 6,630,077 B2 | 10/2003 | Shiang et al. |
| 6,653,765 B1 | 11/2003 | Levinson et al. |
| 6,685,852 B2 | 2/2004 | Setlur et al. |
| 6,692,667 B2 | 2/2004 | Kyeng-Jung |
| 6,696,126 B1 | 2/2004 | Fischer et al. |
| 6,700,322 B1 | 3/2004 | Duggal et al. |
| 6,730,918 B2 | 5/2004 | Srivastava et al. |
| 6,761,837 B2 | 7/2004 | Comanzo et al. |
| 6,777,724 B2 | 8/2004 | Duggal et al. |
| 6,809,471 B2 | 10/2004 | Setlur et al. |
| 6,809,781 B2 | 10/2004 | Setlur et al. |
| 6,844,671 B2 | 1/2005 | Setlur et al. |
| 6,847,162 B2 | 1/2005 | Duggal et al. |
| 6,853,131 B2 | 2/2005 | Srivastava et al. |
| 6,867,536 B2 | 3/2005 | Srivastava et al. |
| 6,879,091 B2 | 4/2005 | Venugopal et al. |
| 6,911,159 B2 | 6/2005 | Rogers et al. |
| 6,936,857 B2 | 8/2005 | Doxsee et al. |
| 6,939,481 B2 | 9/2005 | Srivastava et al. |
| 6,965,193 B2 | 11/2005 | Srivastava et al. |
| 6,969,475 B2 | 11/2005 | Hyland, Jr. et al. |
| 6,982,046 B2 | 1/2006 | Srivastava et al. |
| 7,015,510 B2 | 3/2006 | Srivastava et al. |
| 7,019,452 B2 | 3/2006 | Srivastava et al. |
| 7,022,263 B2 | 4/2006 | Comanzo et al. |
| 7,024,781 B1 | 4/2006 | Cowie |
| 7,026,755 B2 | 4/2006 | Setlur et al. |
| 7,056,451 B2 | 6/2006 | Manivannan et al. |
| 7,056,849 B2 | 6/2006 | Wan et al. |
| 7,077,978 B2 | 7/2006 | Setlur et al. |
| 7,077,980 B2 | 7/2006 | Ramachandran et al. |
| 7,094,362 B2 | 8/2006 | Setlur et al. |
| 7,119,488 B2 | 10/2006 | Soules et al. |
| 7,122,128 B2 | 10/2006 | Comanzo et al. |
| 7,128,849 B2 | 10/2006 | Setlur et al. |
| 7,179,402 B2 | 2/2007 | Srivastava et al. |
| 7,252,787 B2 | 8/2007 | Hancu et al. |
| 7,267,785 B2 | 9/2007 | Srivastava et al. |
| 7,311,859 B1 | 12/2007 | Loureiro et al. |
| 7,608,829 B2 | 10/2009 | Loureiro et al. |
| 7,625,502 B2 | 12/2009 | Clothier et al. |
| 7,658,866 B2 | 2/2010 | Murazaki et al. |
| 7,959,827 B2 * | 6/2011 | Comanzo et al. ...... 252/301.4 R |
| 8,003,012 B2 * | 8/2011 | Comanzo et al. ...... 252/301.4 R |
| 8,333,907 B2 * | 12/2012 | Comanzo et al. ........ 252/301.36 |
| 2005/0212397 A1 | 9/2005 | Murazaki et al. |
| 2006/0222757 A1 | 10/2006 | Loureiro et al. |
| 2007/0131866 A1 | 6/2007 | Srivastava et al. |
| 2008/0171229 A1 | 7/2008 | Comanzo et al. |
| 2008/0179567 A1 | 7/2008 | Comanzo et al. |
| 2010/0136302 A1 | 6/2010 | Comanzo et al. |

OTHER PUBLICATIONS

Lu et al., "Nanosized Strontium Aluminate Phosphors Prepared Via a Reverse Microemulsion Route", Materials Science and Engineering B, vol. 140, pp. 218-221, 2007.

Aitasalo et al., "Persistent Luminescence Phenomena in Materials Doped With Rare Earth Ions", Journal of Solid State Chemistry, vol. 171, pp. 114-122, 2003.

* cited by examiner

PERSISTENT PHOSPHOR

CROSS REFERENCE TO RELATED APPLICATIONS

This is a continuation-in-part of U.S. application Ser. No. 11/954,814, filed Dec. 12, 2007, now copending.

BACKGROUND

A phosphor is a luminescent material that absorbs radiation energy in one portion of the electromagnetic spectrum and emits energy in another portion of the electromagnetic spectrum. One important class of phosphors includes crystalline inorganic compounds of very high chemical purity and of controlled composition, to which small quantities of other elements, called "activators," have been added for fluorescent emission. With the right combination of activators and inorganic compounds, the color of the emission of these crystalline phosphors can be controlled. Most useful and well known phosphors emit radiation in the visible portion of the electromagnetic spectrum in response to excitation by electromagnetic energy outside the visible range. Well known phosphors have been used in mercury vapor discharge lamps to convert the ultraviolet (UV) radiation emitted by the excited mercury to visible light. Other phosphors are capable of emitting visible light upon being excited by electrons, useful in photomultiplier tubes, or X-rays, such as scintillators used in imaging systems.

One important property of phosphors is the decay time, e.g., the time required for the phosphor to stop emitting light after the excitation is removed. Most phosphor compositions have extremely short decay times, with most of the stored energy emitted as light within seconds, or even a small fraction of a second after excitation ends. These phosphors may be useful in lighting type applications where continuous excitation is present. However, in many applications it would be worthwhile to have a phosphorescent material that continues to emit light for long periods of time after excitation has ended. Phosphors based on ZnS compositions were developed to fill this need, but these materials have a number of problems, including low stability, poor color, and a relatively short decay time.

In the past, short decay times were overcome by the use of radio luminescent paint. Radio luminescent paint consists of a radioactive power source mixed with a phosphorescent crystalline pigment. The earliest materials, starting in the early 1900s, were based on the use of radium as the power source. These paints also contained zinc sulfide (ZnS) as a scintillator material, which converted the high energy radioactivity into visible light. These systems had the advantage of being permanently powered luminescent systems, with no need for charging in sunlight or other lighting sources. However, the systems had a number of limitations which led to their use being dramatically reduced or stopped by the late 1970s. Specifically, the majority of the radioactive materials involved were highly toxic, and led to significant doses of radioactivity, both to the manufacturing personnel and to the users of the objects. Newer phosphorescent materials have been developed in an attempt to provide a low-toxicity material with a relatively long decay time. However, few of these materials have decay times of more than a few hours. Thus, upon charging, the materials will visibly glow for two or three hours after the light source is removed, and then fade to the point where they can no longer be seen.

Accordingly, there is a need for a new phosphorescent material that would have low toxicity in comparison to previous phosphorescent materials, and yet would have a decay time of several hours.

BRIEF DESCRIPTION

In one aspect, the present invention relates to phosphors of formula I $$A_x Al_y O_4 : Eu_j, RE_k, B_m, Zn_n, Co_o, Sc_p \qquad I$$

wherein:
A is Ba, Sr, Ca, or a combination of these metals;
x is greater than about 0.75 and less than or equal to 2;
y is greater than or equal to about 1.6 and less than or equal to 2;
j is greater than about 0.0005 and less than about 0.1;
k is greater than about 0.0005 and less than about 0.1;
m is greater than or equal to 0 and less than about 0.30;
n is greater than 0 and less than about 0.10;
o is greater than 0 and less than about 0.01;
p is greater than 0 and less than about 0.05; and
RE is Dy, Nd, or a combination thereof.

In particular embodiments, x is greater than about 0.9 and less than about 1.10.

In another aspect, the present invention relates to articles of manufacture that include the phosphors of formula I.

DRAWINGS

These and other features, aspects, and advantages of the present invention will become better understood when the following detailed description is read with reference to the accompanying drawings in which like characters represent like parts throughout the drawings, wherein.

Figure 17:
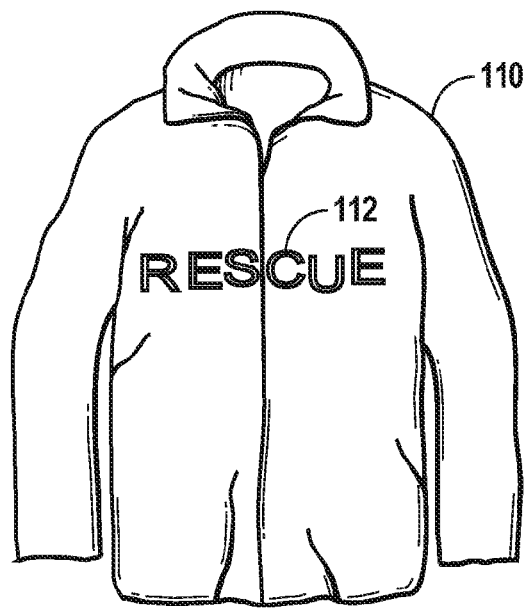
Figure 18:
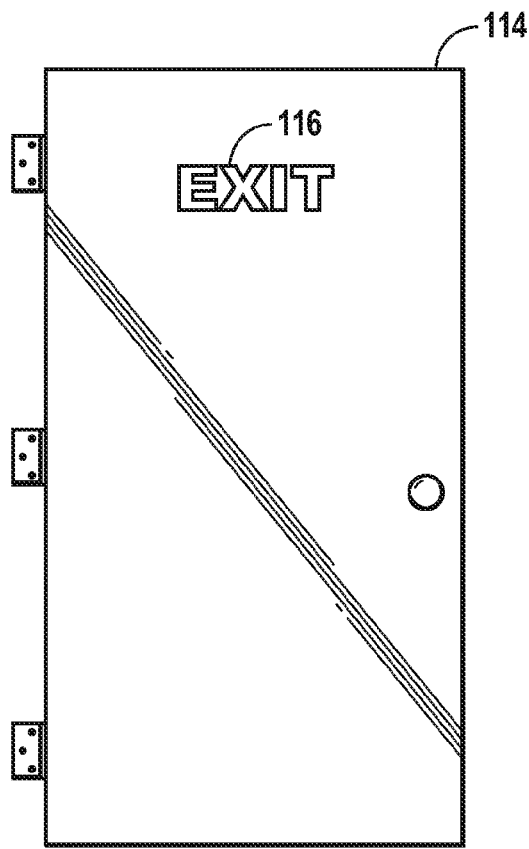

FIG. 17 shows an article of clothing that may either contain persistent phosphor particles in the material itself, or in letters attached to the article of clothing in accordance with embodiments of the current invention; and FIG. 18 is an elevational view of a door with an attached "EXIT" sign that may contain embedded particles of a persistent phosphor in accordance with embodiments of the current invention.

DETAILED DESCRIPTION

I. Overview

The present invention relates to phosphors that include alkaline earth oxides in combination with aluminum oxide, activated by combinations of lanthanoid metals, such as europium, dysprosium, and neodymium. Phosphors made according to this formulation may have a blue or green luminescence and a longer persistence than other types of phosphors.

Phosphors of formula I include alkaline earth oxides in combination with aluminum oxide, activated by combinations of lanthanoid metals, such as europium, dysprosium, and neodymium. Such phosphors may have a blue or green luminescence and a longer persistence than other types of phosphors.

In some embodiments, phosphors of formula I include calcium as the alkaline earth metal, and/or neodymium as the rare earth element RE. One such example containing both Ca and Nd is $Ca_{0.917}Al_2O_4Eu_{0.005}Nd_{0.03}Zn_{0.005}Co_{0.0005}Sc_{0.01}$, which has a blue luminescence. In other embodiments, the phosphors include strontium as the alkaline earth metal and/or dysprosium as the rare earth element RE. One example of a phosphor containing both Sr and Dy is $Sr_{0.9545}Al_{1.89}O_4Eu_{0.01}Dy_{0.03}B_{0.1}Zn_{0.005}Co_{0.0005}Sc_{0.01}$, which has a green luminescence. Although these exemplary materials contain Ca in combination with Nd, and Sr in combination with Dy, in the phosphors of formula I, the rare earth element may be either Nd or Dy, or a combination of Nd and Dy. Likewise, the rare earth element(s) may be combined with Ca, Ba or Sr, or two or more of Ca, Sr, and Ba. In yet other embodiments, m is 0, and phosphors according to the present invention lack boron.

The phosphors of the present invention may be made into particles of about 1 to 5 microns, or larger, using standard firing techniques. Alternatively, nano-scale particles may be made using emulsion techniques.

II. Emission Characteristics and Persistence

Figure 1:
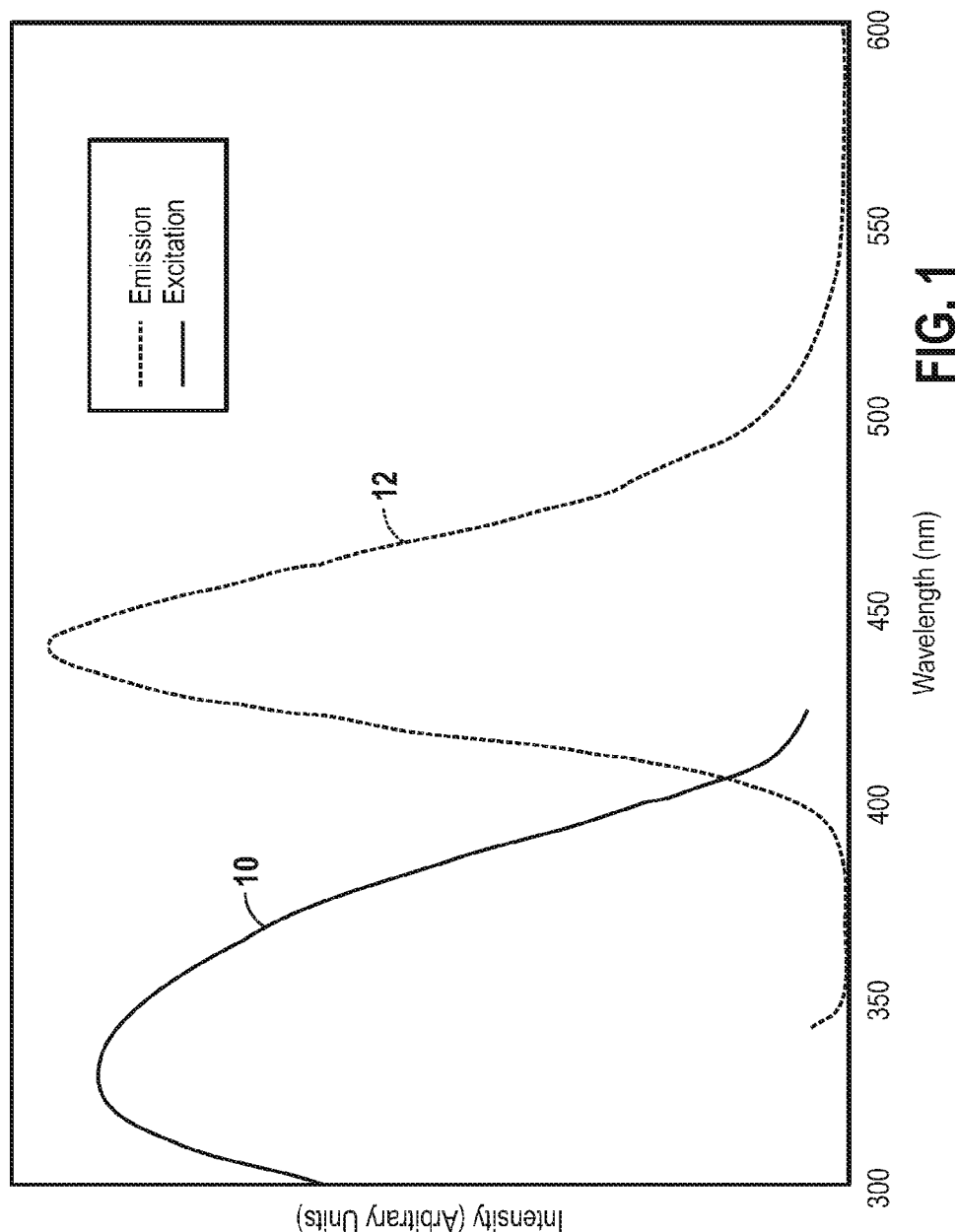
FIG. 1 is a graphical representation of the excitation and emission spectra for a blue persistent phosphor, in accordance with embodiments of the present invention.

The excitation and emission spectra 10, 12 for a blue persistent phosphor in accordance with an embodiment of the present invention are shown in FIG. 1. In this figure it can be seen that the peak of the excitation spectrum 10 is around 340 nm. This allows light from sources that have intensity in this region, such as sunlight or fluorescent lights, to charge the phosphor with energy. As the phosphor is charged, energy is transferred to the activation sites where it is retained by ions in the excited state for long periods of time prior to those ions losing the energy through the emission of a photon. In a presently contemplated embodiment, the spectrum of the emitted light 12 may peak at about 450 nanometers, which is in the blue region of the spectrum.

Figure 2:
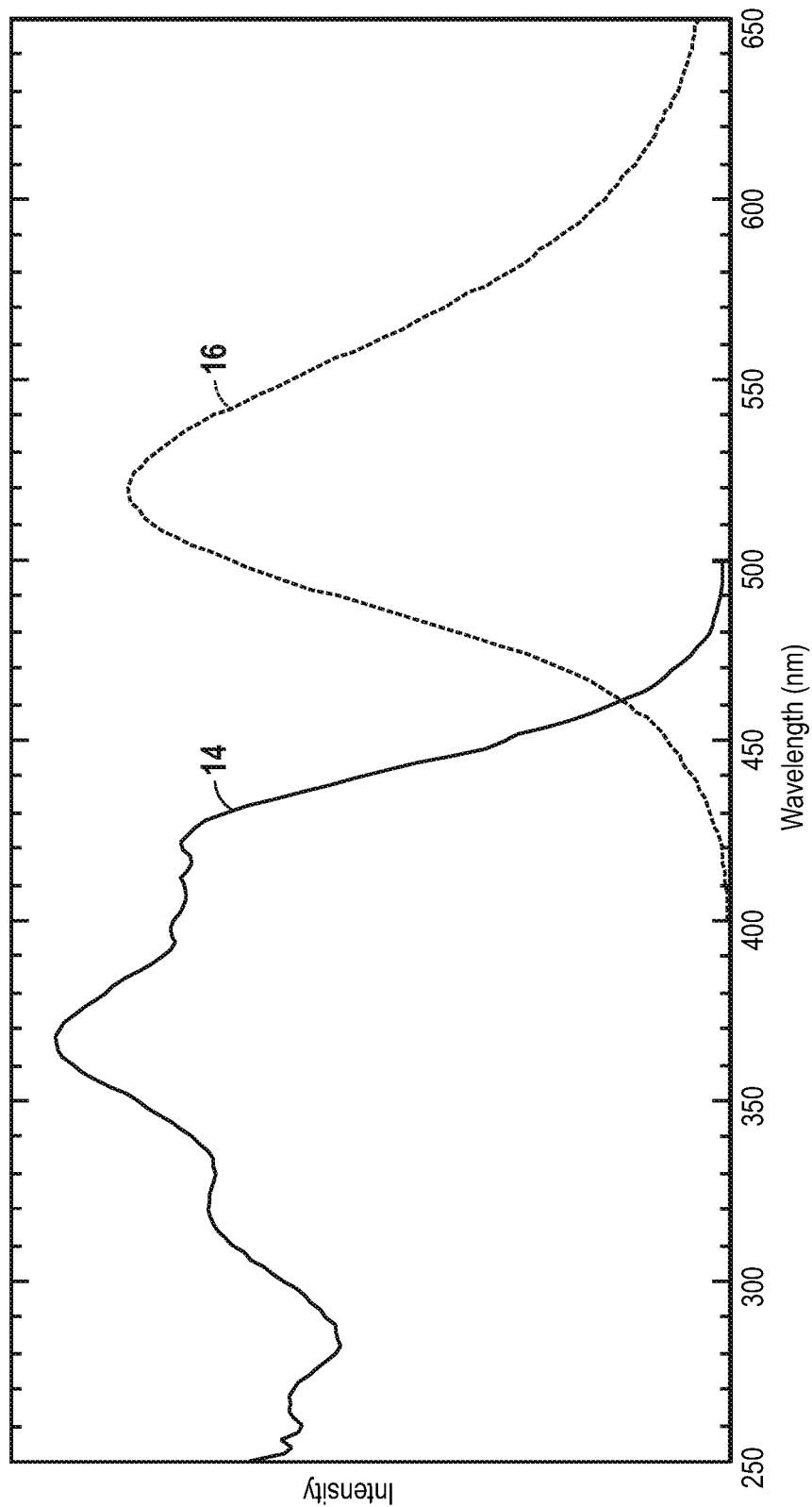
FIG. 2 is a graphical representation of the excitation and emission spectra for a green persistent phosphor, in accordance with embodiments of the present invention.

The excitation 14 and emission 16 spectra for a green persistent phosphor, in accordance with another embodiment, are shown in FIG. 2. In this embodiment, both the absorbance 14 and the emission 16 may be shifted to higher wavelengths in comparison to the excitation 10 and emission 12 for the blue persistent phosphor. For example, the emitted light 16 may peak at about 525 nm, giving the emission a green appearance.

Figure 3:
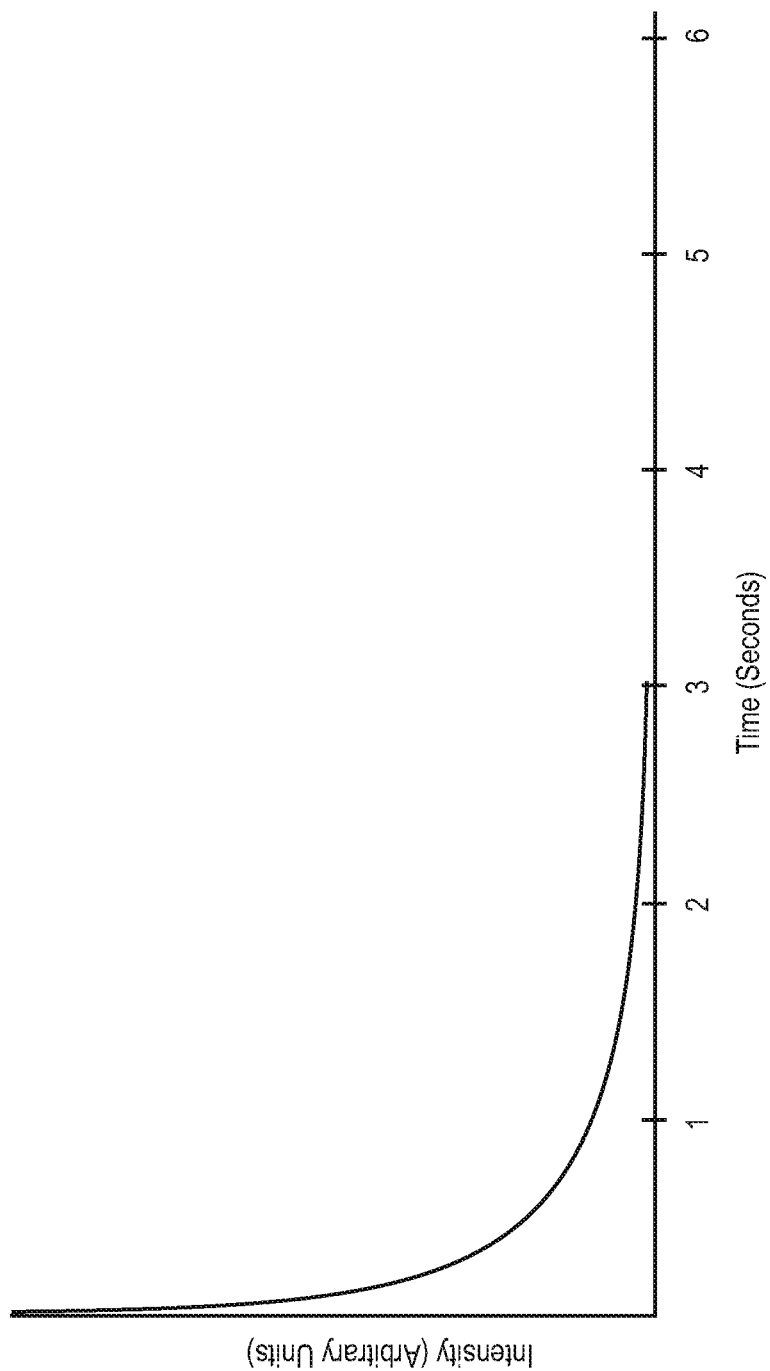
FIG. 3 is a graphical representation of a decay curve representative of a typical short lived phosphor composition.
Figure 4:
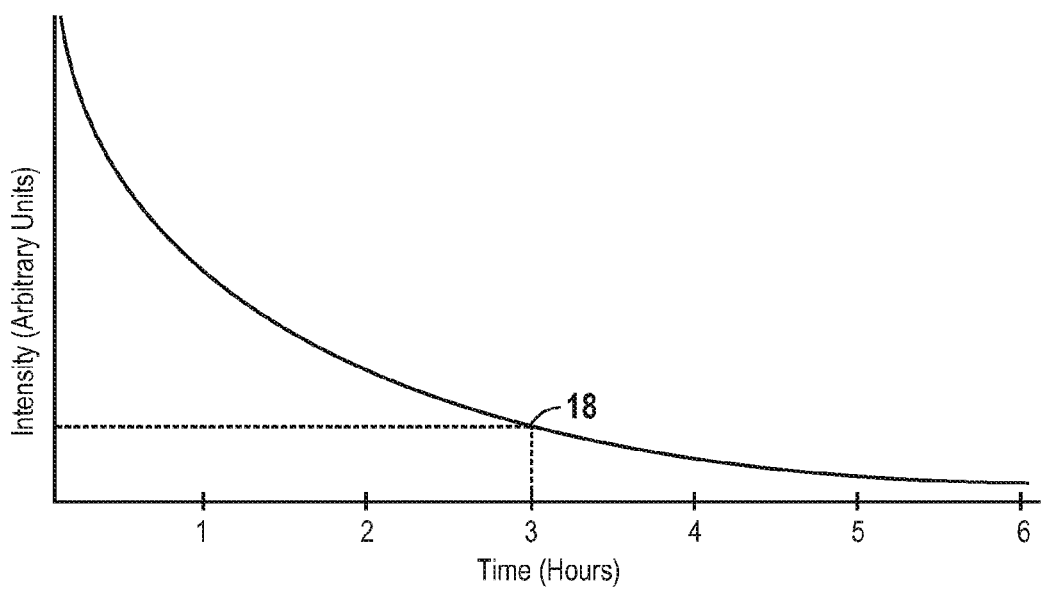
FIG. 4 is a similar graphical representation of a decay curve representative of a typical persistent phosphor composition.

The persistence of phosphors of the present invention may be longer than previous phosphors. For example, FIG. 3 shows a simulated decay curve for a typical phosphor, using a time scale of seconds. A decay curve displays the decay time, e.g., the time required for the phosphor to stop emitting light after the excitation is removed. In this figure, it can be seen that nearly all of the energy of the charged phosphor may be lost within just a few seconds after the excitation is stopped. By comparison, FIG. 4 is a simulated decay curve for a typical persistent phosphor. As can be seen from this figure, the energy retention may be much higher for the persistent phosphor than for the typical phosphor, with a significant amount of emission intensity 18 left after a few hours. This longer decay time may be sufficient for some applications but not for others, since most of the energy may be gone (i.e., the intensity of the emitted light will not be appreciable) within several hours.

Figure 5:
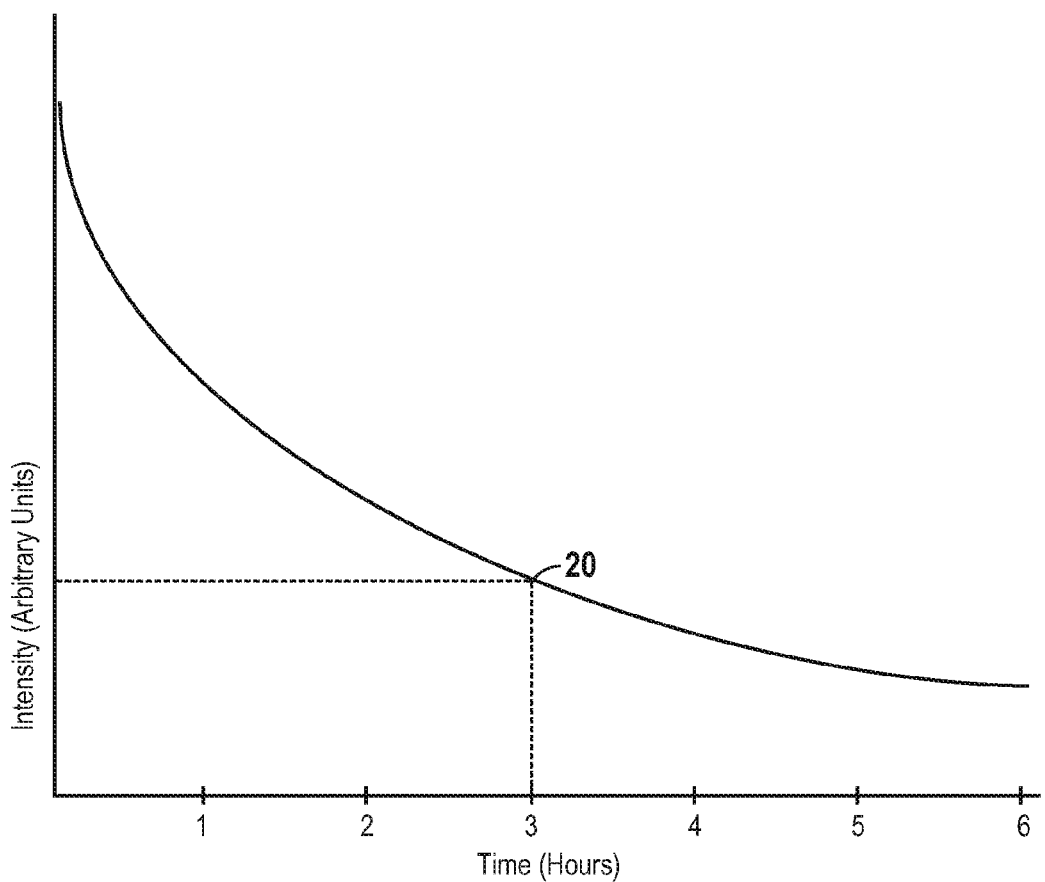
FIG. 5 is a graphical representation of a decay curve representative of a persistent phosphor composition in accordance with embodiments of the present invention.

In contrast to the luminescence decay curves shown in FIGS. 3 and 4, FIG. 5 is a simulated decay curve of a phosphor in accordance with embodiments of the present invention. As can be seen from this decay curve, much more energy may be retained at the equivalent period of time 20 to that discussed with reference to FIG. 4, with the phosphor persisting for as long as 8 hours or more after the charging illumination has been removed. It should be noted that the scale used for decay is typically logarithmic and, thus, the value of the emission intensity at 8 hours is very weak as compared to the initial intensity. However, the remaining intensity may still be strong enough to still be seen by the human eye in a totally dark environment.

III. Embedding Phosphor Particles in a Matrix Material

Figure 6:
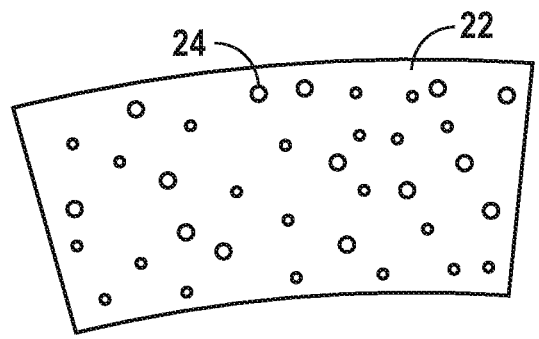
FIG. 6 is a cross-sectional view of an exemplary article of manufacture with embedded persistent phosphor particles, in accordance with embodiments of the present invention.
Figure 7:
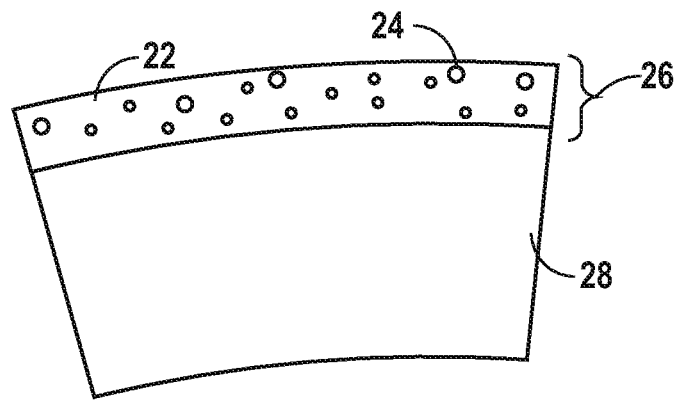
FIG. 7 is cross sectional view of an exemplary article with a laminated film containing persistent phosphor particles, in accordance with embodiments of the present invention.

The persistent phosphors of the present invention may be used in any number of applications requiring long term light in locations that have no energy source for powered lighting. In embodiments of the present invention a plastic matrix 22 may contain embedded particles of a persistent phosphor 24, as shown in FIG. 6. In other embodiments, the phosphor particles 24 may be incorporated into the plastic matrix 22 of a film or surface layer 26 attached to the body 28 of a structure, as shown in FIG. 7. In either of these embodiments, incorporation of the phosphor particles 24 into the matrix 22 or surface layer 26 may be implemented using normal plastics processing techniques. Such techniques could include compression molding, injection molding, sheet forming, film blowing, or any other plastics processing technique that can incorporate a dry powder into a plastic matrix. One skilled in the art will recognize that the plastic matrix material used may be any thermoplastic material with sufficient translucency to allow light transfer through thin layers, including, but not limited to, polystyrene, high impact polystyrene (HIPS), styrene-butadiene copolymers, polycarbonate, polyethylene, polyurethane, polyethylene terephthalate (PET), polyethylene terephthalate glycol (PETG), and polypropylene, among others. Furthermore, thermoset materials may also be used for the plastic matrix, including such compounds as silicon room temperature vulcanized (RTV) compounds and epoxy, phenol-formaldehyde, and melamine resins, among others. In embodiments, the phosphors are incorporated into the thermoset resins by mixing the phosphor with one of the two reactant portions. Further, the matrix 22 does not need to be plastic. One of ordinary skill in the art will recognize that the phosphors of the present invention may be incorporated into glass or ceramic matrices as well.

IV. Compatibilization of Phosphor Particles with a Matrix Material

Particles of the phosphor may lack compatibility with the matrix 22 leading to agglomeration during processing. This effect may be especially severe for smaller particles, such as nano-scale particles, discussed below. For both types of phosphor particles, the effect may be lessened by coating the particles 24 prior to incorporation in the matrix 22. The coating may include either small molecule ligands or polymeric ligands. Exemplary small molecule ligands may include octyl amine, oleic acid, trioctylphosphine oxide, or trialkoxysilane. Those skilled in the art will realize that other small molecule ligands may be used in addition to, or in place of, those listed here. The particles 24 may also be coated with polymeric ligands, which may be either synthesized from the surface of the particles 24 or added to the surface of the nano-scale particles 24.

Figure 8:
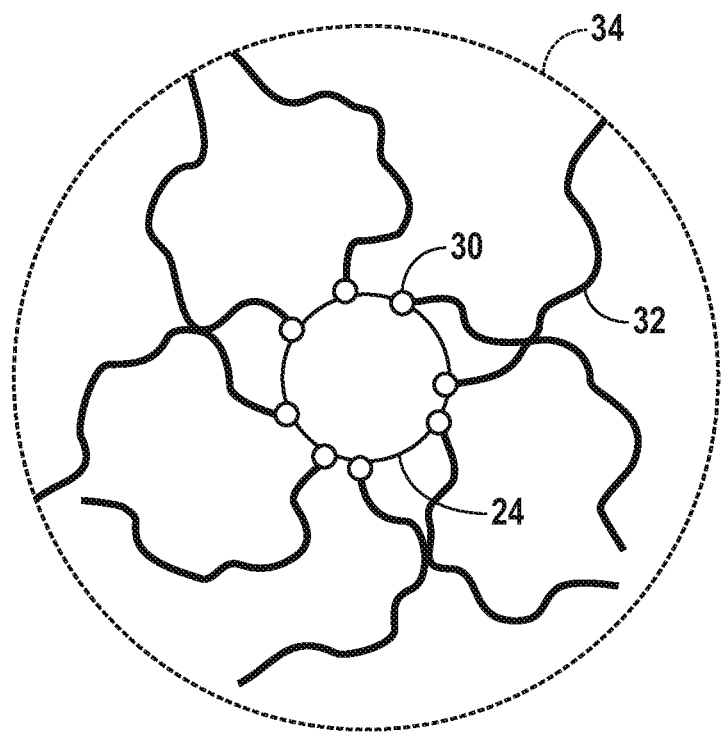
FIG. 8 is a schematic view of a phosphor particle, with adsorbed sites for initiation of a polymerization reaction to form a polymer coating around the particle, in accordance with embodiments of the present invention.

FIG. 8 illustrates an example of coating a particle 24 by growing polymer chains from the surface of the particle 24. In this diagram, the particle 24 is functionalized by the addition of polymer initiation compounds to form polymer initiation sites 30 on the particle 24. In certain embodiments, such polymer initiation compounds may include amines, carboxylic acids, or alkoxy silanes, among others. Those skilled in the art will recognize that other polymer initiation compounds may work in addition to, or in place of, those listed here. Once the particle 24 has been functionalized with the initiation compounds, monomers may be added to the solution to grow polymeric or oligomeric chains 32 from the initiation sites 30. The final size of the shell 34 that is formed around the particle 24 will depend on the number of initiation sites 30 and the amount of monomer added to the solution. Those skilled in the art will recognize that these parameters may be adjusted for the results desired.

Figure 9:
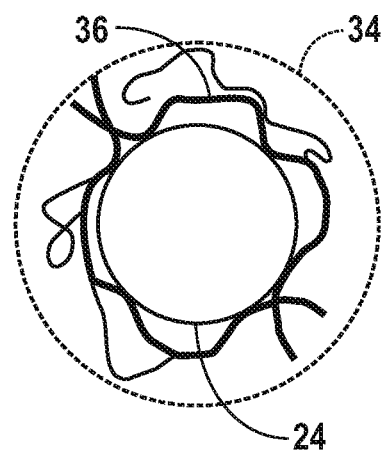
FIG. 9 is a schematic view of a phosphor particle coated with a polymer in accordance with embodiments of the present invention.

FIG. 9 illustrates an example of coating a particle 24 with a polymer 36. In this case, the polymer chain may be chosen to interact with the particle, and may include random copolymers and block copolymers. In the later case, one monomer chain may be chosen to interact with the particle 24, while the other may be chosen to interact with the matrix 22. In certain embodiments, the polymer coating may include such groups as amines, carboxylic acids, and alkoxy silanes, among others. One of ordinary skill in the art will recognize that other functional groups may also be effective.

V. Making the Phosphor Particles

The persistent phosphors of the current invention may be produced in various manners, such as by fixing mixtures of precursor powders under a reducing atmosphere. Alternatively, the persistent phosphors may be produced as nano-scale particles, using an emulsion to control the particle size.

A. Firing of Precursor Powders

Figure 10:
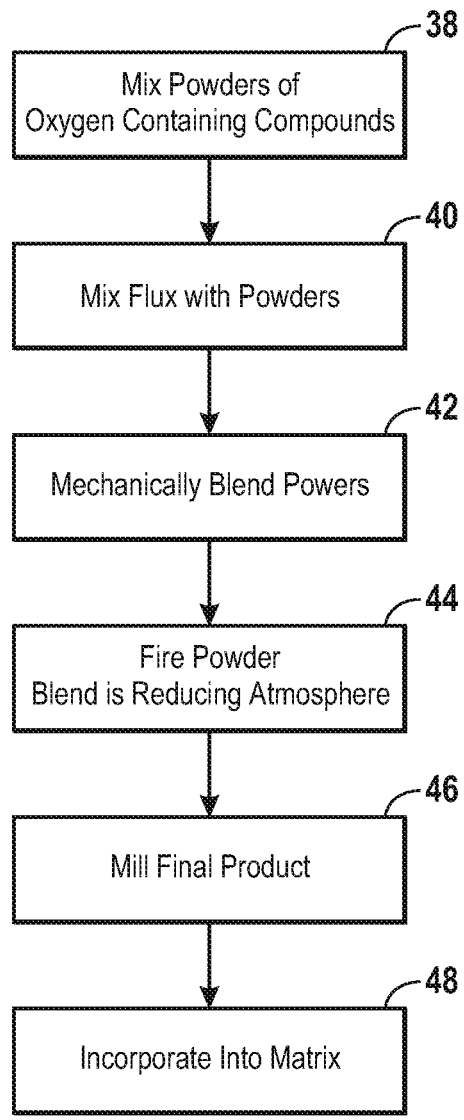
FIG. 10 is a block diagram of a process to make a phosphor in accordance with embodiments of the current invention.

In embodiments, the persistent phosphors may be produced by mixing powders of oxygen-containing compounds of europium, neodymium or dysprosium, an alkaline-earth metal, aluminum, and other metal oxygen-containing compounds, in accordance with the formulations shown above, and then firing the mixture under a reducing atmosphere as shown in Block 38 of FIG. 10. The oxygen-containing compounds may be oxides, carbonates, nitrates, sulfates, phosphates, citrates, carboxylates, and combinations of these compounds. In embodiments containing carboxylates, the carboxylates used may have from one to five carbon atoms, such as formates, ethanoates, proprionates, butyrates, and pentanoates.

In other embodiments, the mixture of starting materials for producing the phosphor may also include a flux, as shown in block 40. The flux may include materials such as, for example, boric acid, lithium tetraborate, lithium carbonate, hydrogen borate, an alkali hydroborate, or a mixture of these compounds.

The oxygen containing compounds may be mixed together, as shown in block 42, by any appropriate mechanical method. In embodiments, such methods may include stirring or blending the powders in a high speed blender, ball mill or a ribbon blender. Those skilled in the art will recognize that any number of other techniques may be used to make a well blended mixture of powders. If the mixture is wet, it may be dried first before being fired. The drying may be carried out at ambient atmosphere or under a vacuum.

The mixture of oxide powders may be fired in a reducing atmosphere, as shown in block 44, at a temperature in a range from about 900° C. to about 1,700° C. for a time sufficient to convert the mixture to the phosphor. In embodiments the temperature may be in the range from about 1,000° C. to about 1,400° C. The firing may be conducted in a batch or continuous process, preferably with stirring or mixing to promote good gas-solid contact. The firing time required may range from about one minute to ten hours, depending on the amount of the oxide mixture being fired, the extent of contact between the solid and the gas of the atmosphere, and the degree of mixing while the mixture is fired or heated. The mixture may rapidly be brought to and held at the final temperature, or the mixture may be heated to the final temperature at a lower rate such as from about 10° C./minute to about 200° C./minute. In embodiments, the temperature is raised to the final temperature at rates of about 10° C./minute to about 100° C./minute.

The firing is performed under a reducing atmosphere, which may include such compounds as hydrogen, carbon monoxide, ammonia, or a mixture of these compounds with an inert gas such as nitrogen, helium, argon, krypton, xenon. In an embodiment, a mixture of hydrogen and nitrogen containing hydrogen in an amount from about 0.5 volume percent to about 10 volume percent may be used as a reducing gas. In another embodiment, the reducing gas may be carbon monoxide, generated in situ in the firing chamber by the reaction between residual oxygen and carbon particles placed in the firing chamber. In yet another embodiment, the reducing atmosphere is generated by the decomposition of ammonia or hydrazine.

The fired phosphor may be milled to form smaller particles and break up aggregates, as shown in block 46. The final phosphor may then be incorporated into the matrix to form the final product, as shown in block 48. If still smaller particles 24 are needed, micro-emulsions may be used to generate nano-scale particles. Such nano-scale phosphor particles may be from about 900 nm to 100 nm in size, or even smaller.

B. Using Emulsions to Generate Nano-scale Particles of Phosphors

In a micro-emulsion, finely dispersed droplets of a solvent are suspended in another immiscible solvent, such as water in oil. The droplets are stabilized by the addition of an amphiphilic molecule, such as a surfactant, which lowers the interfacial energy between the two incompatible solvents. The amount of the amphiphilic molecule may control the size of the droplets, and, thus, the size of the resulting particles. In a water-in-oil configuration, the water droplets are typically sized in the nanometer range, and may be used as reactors to form the final particles.

Figure 11:
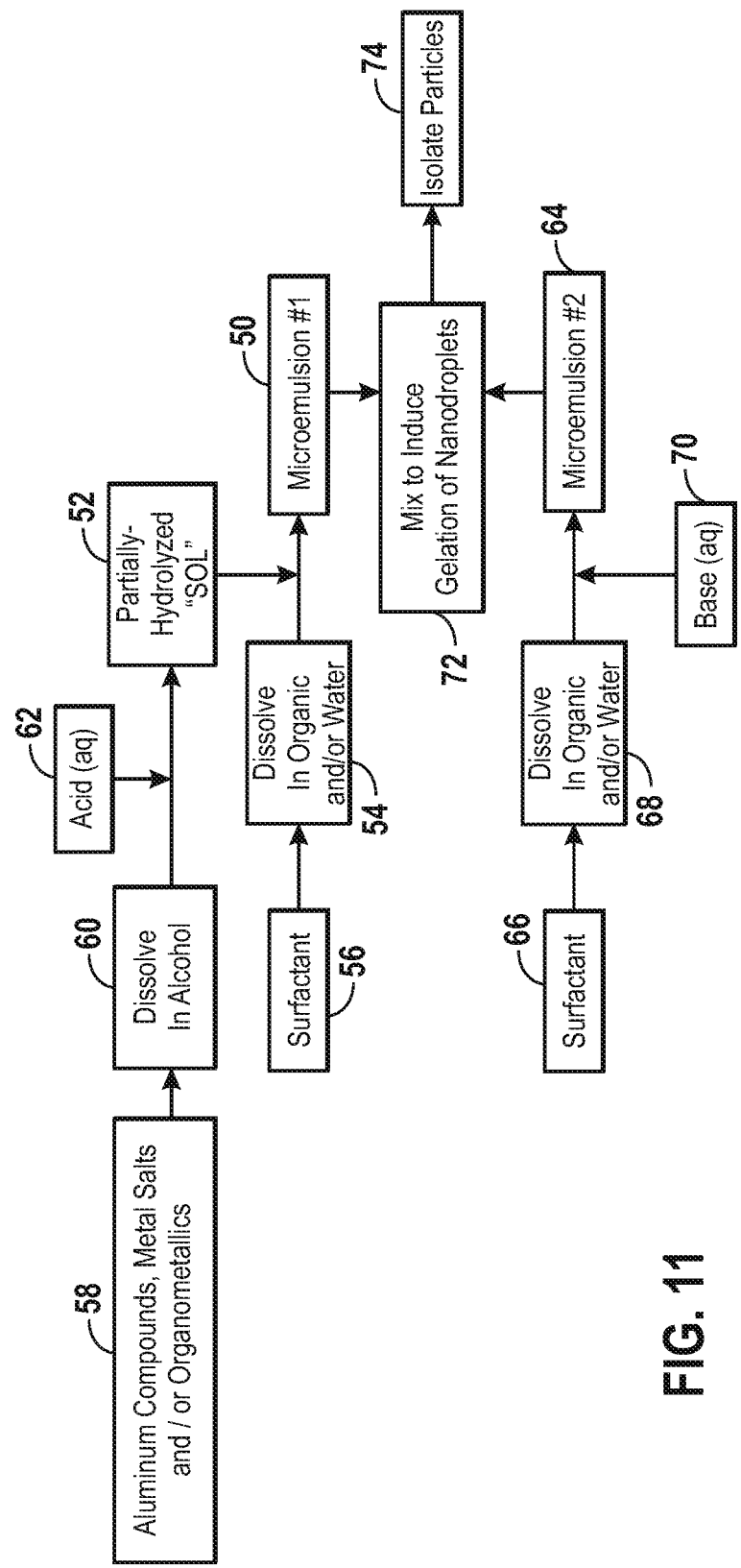
FIG. 11 is a block diagram of a process to make oxide based nano-scale phosphor particles in accordance with embodiments of the present invention.

FIG. 11 is a block diagram of a sol-gel based micro-emulsion process for the formation of nano-scale particles 24 of a metal oxide phosphor. In this procedure, a first micro-emulsion 50 is formed by combining an aqueous sol solution 52 with a solution formed by dissolving a surfactant 56 in an organic or aqueous solvent, as shown in block 54. Generally, the solvent may be an organic.

In this procedure, the aqueous sol solution 52 is formed by first dissolving one or more aluminum compounds, metal salts, and/or organometallics 58 in an alcohol, as shown in block 60. An aqueous acid solution 62 is then added to the alcohol solution to partially hydrolyze the aluminum compounds, leading to the formation of the sol solution 52. In embodiments which have an aluminum oxide matrix, aluminum containing compounds may be used, including, for example, triethylaluminum or metal (tertraethyl aluminum), wherein the metal comprises at least one metal anion selected from the group consisting of lanthanoids, group 1 metals, group 2 metals, group 3 metals, group 6 metals, group 12 metals, group 13 metals, group 14 metals, and group 15 metals.

The metal salts chosen depend on the final metal oxide desired. In an embodiment, the metal salts are $Eu(NO_3)_2$, $Nd(NO_3)_3$, $Zn(NO_3)_2$, and $Co(NO_3)_3$. One of ordinary skill in the art will recognize that each independent phosphor will require the choice of appropriate precursor salts.

The second component of the first micro-emulsion 50 is formed by dissolving a surfactant 56 in a solution 54, which generally may be an organic. In an embodiment, the surfactant is polyoxyethylene (5) nonylphenylether, available as Igepal® CO-520 from ICI Americas. Those skilled in the art will recognize that any number of surfactants may be employed, including such surfactants as aromatic ethoxylates; polyethylene glycol dodecyl ethers, available as Brij® from ICI Americas; sorbitan-fatty acid ester surfactants, available as Tween® from ICI Americas; polyoxyethylenesorbitan fatty acid ester surfactants, available as Span® from ICI Americas; or alkylphenols, among others. In an embodiment, the organic solvent is n-hexane. Those skilled in the art will recognize that any number of other organic solvents, including alkyl or aryl solvents, may be used.

The second micro-emulsion 64 is formed by dissolving a surfactant 66 in a solvent, as shown in block 68. The solvent may generally be an organic. A solution of an aqueous base 70 is added to the solution formed in block 68 to form the second microemulsion 64. In an exemplary implementation, the surfactant may be polyoxyethylene (5) nonylphenylether, available as Igepal® CO-520 from ICI Americas. As discussed above, however, any number of other surfactants may be employed while remaining within the scope of the present disclosure. In an exemplary implementation, n-hexane is used as the solvent. Those skilled in the art will recognize that any number of other organic solvents, including alkyl or aryl solvents, may be used. In certain embodiments of the present technique, the aqueous base is ammonium hydroxide. Those skilled in the art will realize that other aqueous base solutions may be employed while remaining within the scope of the present disclosure.

The first micro-emulsion 50 and the second micro-emulsion 64 are combined, as shown in block 72, to form another micro-emulsion containing nano-scale droplets of a sol-gel containing a metal oxide precursor for the phosphor. The particles of the sol-gel material may be isolated from the combined micro-emulsion, as shown in block 74. In an exemplary implementation, this isolation may be performed by freeze-drying. Those skilled in the art will recognize that other techniques may also be employed to isolate the particles, including pressure filtration and centrifugation, among others. After isolation, the particles may be fired to form the final nano-scale particles of the metal oxide phosphor. This firing is typically performed under a controlled atmosphere at 900-1400° C., for a period of 1 minute to ten hours. Those skilled in the art will recognize that the precise conditions required for firing will depend on the particle size and materials chosen.

Figure 12:
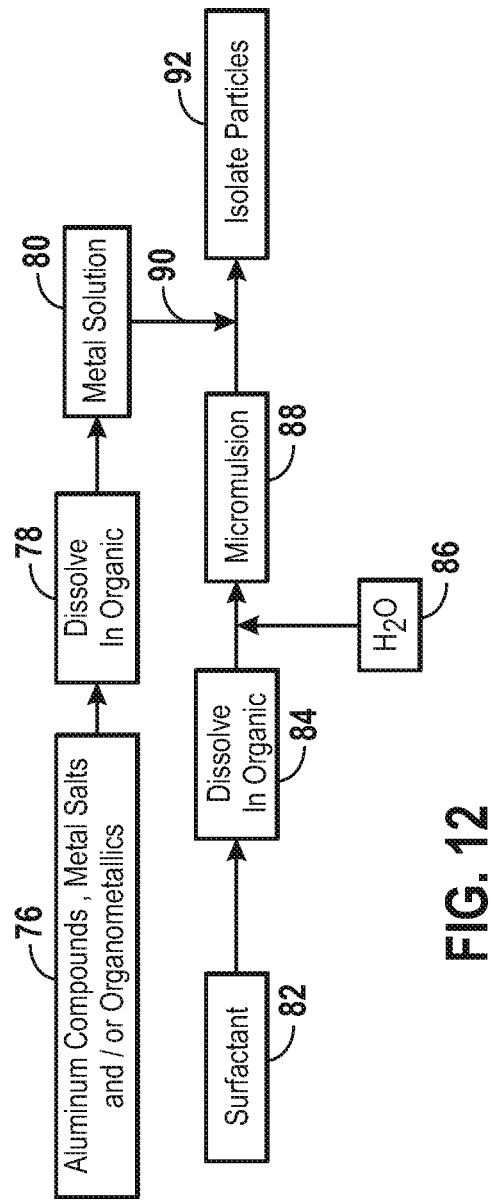
FIG. 12 is a block diagram of another process to make oxide based nano-scale phosphor particles in accordance with embodiments of the present invention.

FIG. 12 is a block diagram of another procedure for the formation of a metal oxide based phosphor, in accordance with certain embodiments. In this procedure, one or more aluminum compounds and one or more organic metal salts 76 are dissolved in an organic solvent, as shown in block 78, to form a metal solution 80. In embodiments, the aluminum compounds may be triethyl aluminum, or metal (tetraethylaluminum), as discussed with respect to FIG. 11, above. The metal salts chosen depend on the final metal oxide desired. In an embodiment, the organic metal salts include hexanoate or carboxylate salts of europium, neodymium, dysprogium, zinc, cobalt, and/or a boron compound. Those skilled in the art will recognize that other metal oxide phosphors, such as those discussed above, may be made using this process, requiring different metal salts be chosen.

A surfactant 82 is then dissolved in an organic solvent, as shown in block 84. Water 86 is added to this solution to form a micro-emulsion 88. In an embodiment, the surfactant is polyoxyethylene (5) nonylphenylether, available as Igepal® CO-520 from ICI Americas. Those skilled in the art will recognize that any number of surfactants may be employed, including such surfactants as aromatic ethoxylates; polyethylene glycol dodecyl ethers, available as Brij® from ICI Americas; sorbitan-fatty acid ester surfactants, available as Tween® from ICI Americas; polyoxyethylenesorbitan fatty acid ester surfactant, available as Span® from ICI Americas; or alkylphenols, among others. In an embodiment, the organic solvent is n-hexane. Those skilled in the art will recognize that any number of other organic solvents, including alkyl or aryl solvents, may be used.

The metal solution 80 may be heated and slowly added to the micro-emulsion 88, as indicated by reference numeral 90, to form sol-gel particles containing the metal oxide precursors. As shown in block 92, these particles may be isolated from the micro-emulsion, such as by freeze-drying. Those skilled in the art will recognize that other techniques may also be employed to isolate the particles, including pressure filtration and centrifugation, among others. After isolation, the particles may be fired to form the final nano-scale particles of the metal oxide phosphor. This firing is typically performed under a controlled atmosphere at 900-1400° C., for a period of 1 minute to ten hours. Those skilled in the art will recognize that the precise conditions required for firing will depend on the particle size and materials chosen.

VI. Specific Uses of Phosphors

The phosphor particles 24 of the present invention may be incorporated into numerous products used in low light applications. In various aspects, a structure containing the phosphor may be, but not limited to, a piece of safety equipment, a toy, an input device, a sign, an emergency exit indicator, an instrument panel control, an electrical switch, a circuit breaker switch, a piece of furniture, a communication device, a face on a wristwatch, a number on a wristwatch face, a clock face, a number on a clock face, a piece of kitchenware, a utensil, a label, a car dashboard control, a stair tread, an article of clothing, a lamp, a weapon sight, and a display.

Figure 13:
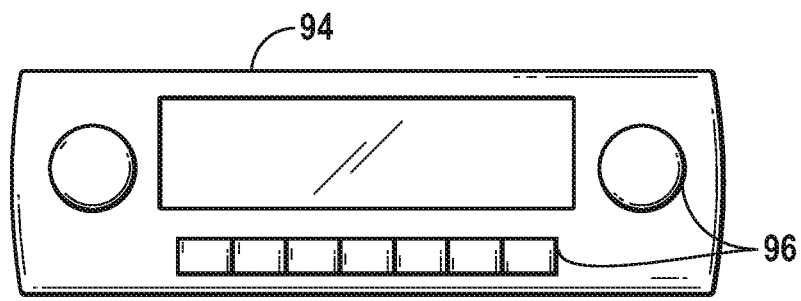
FIG. 13 is an elevational view of an exemplary faceplate panel from an automobile radio, with knobs and a faceplate that may contain embedded persistent phosphor particles in accordance with embodiments of the present invention.

For example, FIG. 13 shows the front faceplate 94 of a car radio. In embodiments the phosphors could either be incorporated in the faceplate 94, or in the controls 96 attached to the faceplate 94.

Figure 14:
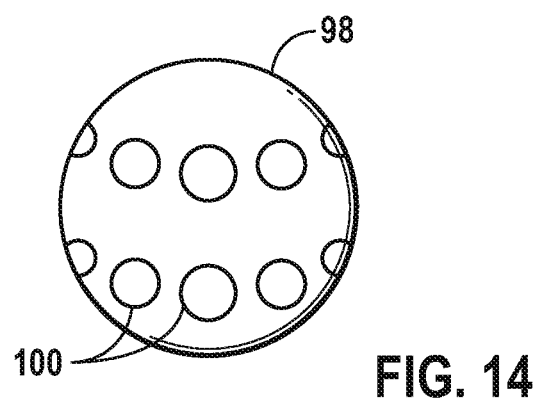
FIG. 14 illustrates a child's toy that may be decorated with a persistent phosphor in accordance with embodiments of the present invention.

Additionally, the low toxicity of the phosphors of the present invention makes applications such as toys and other commercial or consumer goods a possibility. FIG. 14 shows a child's toy 98 with various decorations 100 attached to the outside. In embodiments, the persistent phosphors may be incorporated into the structure of the toy 98, or into the decorations 100 applied to the outside.

Figure 15:
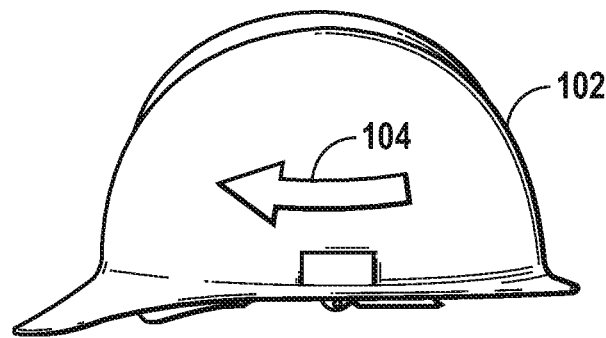
FIG. 15 illustrates a hard hat that may contain persistent phosphor particles or have an attached sticker containing embedded persistent phosphor particles in accordance with embodiments of the current invention.
Figure 16:
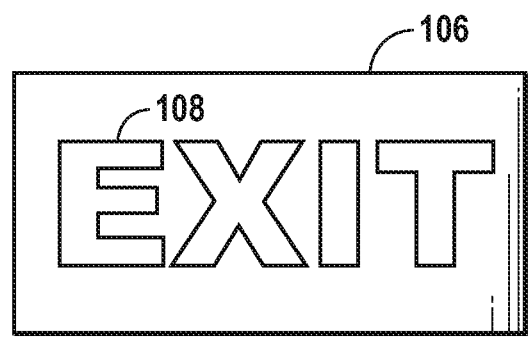
FIG. 16 shows a safety exit sign that may contain embedded persistent phosphor particles, in accordance with embodiments of the current invention.

Furthermore, the long persistence of the phosphors of the present invention makes them useful for applications in emergency equipment. FIG. 15 shows a hard hat 102. In embodiments, the phosphors may be incorporated into the body of the hard hat 102 or into stickers or decals 104 applied to the side of the hard hat 102. FIG. 16 shows an emergency exit sign 106. In embodiments the persistent phosphors may by incorporated into the sign 106 or into the lettering 108 on the sign 106. FIG. 17 illustrates an article of clothing 110 with lettering 112. In embodiments the persistent phosphor could be incorporated either into the fabric of the article of clothing 40 or into the lettering 112. In FIG. 18, a door 114 has attached letters 116, spelling the word "EXIT" in this example. In embodiments the lettering 116 could either be colored, so as to be visible at all times, or clear, so as to be visible only in low light conditions, when the glow from the incorporated phosphors may be visible.

The applications above are but a few examples of embodiments of the present invention and are not intended to limit its application to those uses. Those skilled in the art will recognize that a long lived persistent phosphor may be useful in a large variety of applications beyond the ones listed above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A phosphor of formula: $Ca_{0.917}Al_2O_4Eu_{0.005}Nd_{0.03}Zn_{0.005}Co_{0.0005}Sc_{0.01}$.

2. A phosphor of formula: $Sr_{0.9545}Al_{1.89}O_4Eu_{0.01}Dy_{0.03}B_{0.1}Zn_{0.005}Co_{0.0005}Sc_{0.01}$.

3. An article of manufacture comprising a phosphor of formula $Ca_{0.917}Al_2O_4Eu_{0.005}Nd_{0.03}Zn_{0.005}Co_{0.0005}Sc_{0.01}$.

4. An article of manufacture comprising a phosphor of formula $Sr_{0.9545}Al_{1.89}O_4Eu_{0.01}Dy_{0.03}B_{0.1}Zn_{0.005}Co_{0.0005}Sc_{0.01}$.

* * * * *